Aug. 3, 1943.  L. F. BLUME  2,325,936
REGULATING CIRCUIT
Filed Nov. 25, 1941
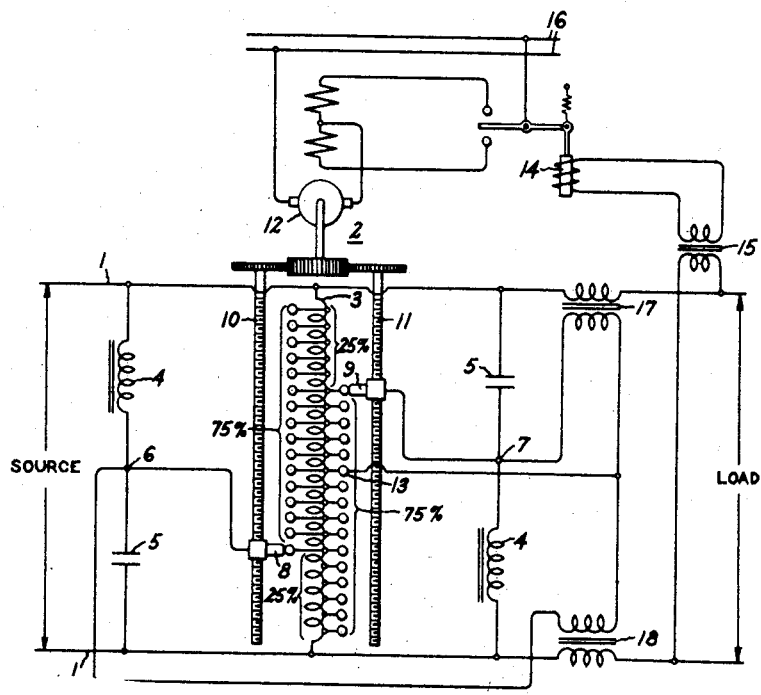
Inventor:
Louis F. Blume,
by *Harry E. Dunham*
His Attorney.

Patented Aug. 3, 1943

2,325,936

UNITED STATES PATENT OFFICE 2,325,936

REGULATING CIRCUIT

Louis F. Blume, Pittsfield, Mass., assignor to General Electric Company, a corporation of New York Application November 25, 1941, Serial No. 420,373

20 Claims. (Cl. 172—238)

This invention relates to regulating circuits and more particularly to an improved wattless-current regulator.

In my Patent No. 1,992,809, granted February 26, 1935, on an application filed April 5, 1933, and assigned to the assignee of the present application, there is described and claimed a transformer tap-changing circuit which varies the amount of leading current taken by a capacitor and at the same time varies the magnitude of a regulator voltage inserted in the circuit by a winding.

In the present invention I provide what might be called a static equivalent of the synchronous condenser because it is capable of drawing widely variable amounts of either leading or lagging current from a power circuit to which it is connected while at the same time it has no rotating parts and in fact during normal operation it has no moving parts. It is characterized by having extremely low losses, these losses being considerably less than the equivalent synchronous condenser.

This improved wattless-current regulator may also be combined with auxiliary means for inserting directly in the circuit a controllable regulating voltage. In this way the voltage regulating range of the device is materially increased because it is well known that the leading current taken by a synchronous condenser when drawn through the usual inductive reactance of a power line serves to raise the circuit voltage. In a preferred form of my circuit this action of the leading current is supplemented by the action of voltage regulating means and similarly the corresponding voltage lowering action of lagging current taken by the device is supplemented by the action of voltage regulating means.

An object of the invention is to provide a new and improved electrical regulator.

Another object of the invention is to provide a new and improved low-loss wattless-current regulator for alternating-current power circuits.

Another object of the invention is to provide a new and improved wide-range combined wattless-current regulator and voltage regulator.

The invention will be better understood from the following description taken in connection with the accompanying drawing and its scope will be pointed out in the appended claims.

Referring now to the single figure of the drawing, in which there is shown diagrammatically a preferred embodiment of the invention, a main alternating-current power circuit 1 is shown as being provided with a source end and a load end. Connected to the circuit between these two ends is a regulator shown generally at 2. The principal elements of the regulator are a multi-tapped autotransformer 3, a pair of reactors 4 and a pair of capacitors 5. The autotransformer winding is connected across the circuit 1. For best results, although it should be understood that it is not essential in its broader aspects, the four reactance elements all have equal ohmic values. They are interconnected in the form of a so-called monocyclic square, with one diagonal or pair of opposite terminals connected across the circuit. This connection is characterized by having one reactor in series with one capacitor across the circuit and the other capacitor in series with the other reactor across the circuit, the order of connection of the reactive elements in the two parallel circuits being opposite so that, for example, with respect to either one of the two main circuit conductors the reactors of one of the parallel circuits is connected directly thereto and the capacitor of the other parallel circuit is connected directly thereto.

The remaining terminals 6 and 7 of the reactive bridge or square are connected respectively to tap changers 8 and 9 which are adapted to be moved from tap to tap of the autotransformer. These tap changers are shown schematically but it should be understood that in practice they will be standard load ratio control tap changers capable of making connection from tap to tap without opening the circuit; for example, they can be of the well-known double-finger construction employing a mid-tapped reactor or so-called preventive autotransformer. They are driven simultaneously by any suitable mechanism shown by way of example as a pair of screw shafts 10 and 11 operated by suitable gearing from a reversible motor 12. The tap changer drive is such that the two tap changers always move in opposite directions. Furthermore, best results are obtained when they are always located symmetrically with respect to a given tap, such for example as a center tap 13 on the winding 3.

The operation of the device as thus far described is as follows: With the tap changers in the position shown the voltages across the reactors 4 are substantially greater than the voltages across the capacitors 5. Consequently, the current taken by the reactors is substantially greater than the current taken by the capacitors and the system draws a net lagging current from the main circuit 1. If now the tap changers are operated so as to move them toward each other, the reactor voltages decrease and the capacitor voltages increase, thus decreasing the net lagging current until both tap changers make contact with the center tap 13. In this position the lagging and leading currents are equal. As the tap changers pass each other and move apart the capacitor voltages will exceed the reactor voltages by progressively increasing amounts so that the device draws a progressively increasing net leading current.

As the reactor and capacitor which are connected to point 6 are also connected to opposite sides of the main circuit their currents add in the tap changer 8, and the same thing is true with respect to the point 7 and the tap changer 9. However, because the two capacitor-reactor combinations are reversely connected the two tap changer currents subtract from each other in the autotransformer winding. Consequently the required kva. rating of the autotransformer is very low in comparison with the kva. of the wattless current actually drawn by the device from the circuit. In this manner it is possible to construct the device at low cost while at the same time they give it very high efficiency.

In synchronous condensers the maximum lagging kva. is generally less than the maximum leading kva. This result can readily be obtained in the illustrated circuit while at the same time maintaining the equality of the inductive and capacitive ohms, by not extending the tap range over the entire autotransformer winding, so that at the limit for maximum lagging reactive kva., only a fraction of the circuit voltage is applied to the reactors. Thus, if the maximum lagging reactive kva. required is fifty per cent of the maximum leading reactive kva., the taps should be placed so that the maximum voltage applied across the reactors is seventy-five per cent of the circuit voltage. This arrangement is shown in the drawing. A further advantage accomplished by this arrangement is that the volts per tap are reduced, in this example by .75, whereby the rupturing duty on the load ratio control equipment is appreciably reduced.

Another unique and desirable characteristic of the circuit is that when the inductive ohms equal the capacitive ohms and the voltage steps or tap settings are equal, the change in reactive load per step becomes a constant. Each step or tap change adds or subtracts an equal kva. Under these conditions the current switched by the tap changer is equal on all steps.

The regulator may be made automatic in operation by means of a voltage responsive control system comprising a primary voltage sensitive relay 14 connected to respond to the voltage of the circuit 1 by any suitable means, such as by means of a potential transformer 15. The primary relay is connected to control the direction of operation of the motor 12 in any suitable and well-known manner, the source of current for the motor being indicated by a control supply circuit 16. In automatic operation a decrease in circuit voltage may be made to operate the motor 12 in such a direction as to cause the device to draw an increased net leading current, whereas with an increase in circuit voltage the motor may be reversed so as to cause the wattless-current regulator to draw an increasing net lagging current.

In order to extend the voltage regulating range of the device its action may be supplemented by additional means for directly varying the voltage of the circuit. A suitable arrangement for this purpose comprises a pair of series transformers 17 and 18 connected respectively in the two conductors of the main circuit. The primary windings of these transformers may be connected across any portions of the regulator whose voltages vary as the positions of the tap changers vary and the polarity of the connections may be such as to produce the desired regulating effect. For example, the primary winding of transformer 17 may be connected between the terminal 7 and the mid-tap 13 and the primary winding of transformer 18 may be connected between terminal 6 and the mid-tap 13. The polarities will be such that with the tap changers in their illustrated positions the series transformers will produce bucking voltages which reduce the main circuit voltage. As the tap changers move toward each other these bucking voltages decrease and finally become zero when the tap changers both make contact with the center tap. Further operation of the tap changers reverses the voltages of the series transformers so that they become voltage boosters and in this manner supplement the voltage raising action of the net capacitive current of the regulator.

It will be obvious, however, that some regulating effect from the series transformers will also be obtained if their primary windings were connected across the capacitors or across the reactors with the proper polarity.

While I have shown and described a particular embodiment of my invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In combination, an alternating-current power circuit, a capacitor connected to draw a wattless leading current through said circuit, a reactor connected to draw a wattless lagging current through said circuit, and means for inversely varying the magnitude of said currents while keeping them in quadrature with the voltage of said circuit.

2. A wattless current regulator for an alternating-current power circuit comprising, in combination, a capacitor, a reactor, means for effectively connecting said capacitor and reactor in series across said circuit whereby said capacitor and reactor each have a terminal at the same potential, and means for varying the magnitude of the potential of said terminal while keeping the potential of said terminal in phase with the voltage of said circuit.

3. A wattless current regulator for an alternating-current circuit comprising, in combination, a capacitor, a reactor, means for effectively connecting said capacitor and said reactor to said circuit, and means for inversely varying the magnitudes of the voltages across said capacitor and said reactor while maintaining said voltages in phase with each other.

4. In combination, an alternating-current circuit, a capacitor, a reactor, means for connecting both said capacitor and said reactor to said circuit so as simultaneously and continuously to cause leading and lagging currents to flow therein, and means for oppositely varying the values of said leading and lagging currents over a wide range, said means comprising a transformer tap changer for simultaneously and oppositely varying the voltages across said capacitor and reactor.

5. A wattless current regulator for an alternating-current power circuit comprising, in combination, a transformer having a multi-tapped winding excited from said circuit, means for deriving a pair of voltages from said winding, means for changing tap connections on said winding so as simultaneously and oppositely to vary said voltages, a capacitor connected to said transformer tap-changing means and to said winding so as to be energized in accordance with one of said voltages, and a reactor connected to said transformer tap-changing means and to said winding so as to be energized in accordance with the other of said voltages whereby operation of said last-mentioned means causes oppositely varying amounts of substantially wattless leading and lagging current to be supplied to said circuit.

6. The combination as in claim 5, in which certain intermediate values of said voltages are equal whereby the range of oppositely varying leading and lagging currents extends from net leading to net lagging currents.

7. In combination, an alternating-current circuit, tapped autotransformer winding connected thereacross, a capacitor and reactor serially connected across said circuit, means for impressing P per cent of the transformer voltage across said capacitor and (100—P) per cent of said voltage across said reactor, and tap-changing means for varying the value of P.

8. The combination as in claim 7, in which said capacitor and reactor have equal effective ohmic values and P goes from above 50 to below 50.

9. In combination, a monocyclic square, a multi-tapped transformer winding connected across one diagonal of said square, a pair of tap changers connected respectively to the remaining terminals of said square, and means for moving said tap changers in opposite directions with respect to said taps.

10. The combination as in claim 9, in which said transformer is an autotransformer.

11. The combination as in claim 9, in which said taps are equally spaced.

12. The combination as in claim 9, in which said tap changers are always symmetrically located with respect to a center tap.

13. In combination, an alternating-current circuit, a transformer type buck and boost voltage regulator therefor, reactive means including an inductance and a capacitance, and means operated by said regulator for connecting said reactive means to said circuit so that it draws a lagging current in proportion to the voltage buck of said regulator and a leading current in proportion to the voltage boost of said regulator.

14. In combination, an alternating-current circuit, a transformer type boost or buck voltage regulator therefor, capacitive means connected to draw leading current from said circuit in proportion to the voltage boost of said regulator, and inductive means connected to draw lagging current from said circuit in proportion to the voltage buck of said regulator.

15. In combination, an alternating-current circuit, a transformer type voltage-bucking voltage regulator therefor, and inductive means connected to draw lagging current from said circuit in proportion to the magnitude of the voltage buck of said regulator.

16. In combination, an alternating-current circuit, a transformer type buck and boost voltage regulator therefor, and inductive means connected to draw lagging current from said circuit in proportion to the voltage buck of said regulator.

17. In combination, an alternating-current power circuit, an autotransformer connected thereacross, a plurality of intermediate taps on said autotransformer, a movable tap changer for selectively making connection to said taps, a reactor connected between said tap changer and one side of said circuit, and a capacitor connected between said tap changer and the other side of said circuit.

18. In combination, an alternating-current circuit, means for introducing a variable increment of voltage with a reversible algebraic sign into the circuit and means for introducing a variable increment of wattless current with a reversible algebraic sign into said circuit, and means for simultaneously operating said two first-mentioned means in response to an electrical condition of said circuit so that said increment of wattless current shall have a predetermined algebraic ratio to said increment of voltage.

19. A wattless current regulator for an alternating-current power circuit comprising, in combination, a capacitor, a reactor, means for effectively connecting said capacitor and reactor in series across said circuit whereby said capacitor and reactor each have a terminal at the same potential, means for varying the magnitude of the potential of said terminal over a range equal to the voltage of said circuit while keeping the potential of said terminal in phase with the voltage of said circuit comprising a transformer winding connected across said circuit with all its turns on a common magnetic core, and means for effectively connecting said terminal selectively to intermediate points on said winding.

20. In combination, a winding having a plurality of electrically equal spaced taps, a pair of tap changers for selectively making contact with said taps, means for simultaneously operating said tap changers in such a manner that the sum of their voltages is constant, a capacitor and a reactor connected respectively between one end of said winding and said tap changers, and a reactor and a capacitor connected respectively between the other end of said winding and said tap changers, said connections being such that there is a capacitor in series with each reactor across said winding.

LOUIS F. BLUME.